US009065908B2

(12) United States Patent
Buer et al.

(10) Patent No.: US 9,065,908 B2
(45) Date of Patent: Jun. 23, 2015

(54) METHOD AND SYSTEM FOR ENSURING USER AND/OR DEVICE ANONYMITY FOR LOCATION BASED SERVICES (LBS)

(75) Inventors: Mark Buer, Gilbert, AZ (US); Charles Abraham, Los Gatos, CA (US); David Garrett, Tustin, CA (US); Jeyhan Karaoguz, Irvine, CA (US); David Lundgren, Mill Valley, CA (US); David Murray, Mission Viejo, CA (US)

(73) Assignee: Broadcom Corporation, Irvine, CA (US)

(*) Notice: Subject to any disclaimer, the term of this patent is extended or adjusted under 35 U.S.C. 154(b) by 787 days.

(21) Appl. No.: 12/732,849

(22) Filed: Mar. 26, 2010

(65) Prior Publication Data

US 2011/0201305 A1  Aug. 18, 2011

Related U.S. Application Data (60) Provisional application No. 61/304,947, filed on Feb. 16, 2010.

(51) Int. Cl.
*H04M 3/16* (2006.01)
*H04W 4/02* (2009.01)
*H04M 3/42* (2006.01)
*H04W 12/02* (2009.01)

(52) U.S. Cl.
CPC ...... *H04M 3/42357* (2013.01); *H04M 3/42008* (2013.01); *H04W 4/02* (2013.01); *H04W 12/02* (2013.01)

(58) Field of Classification Search
CPC ................ H04M 3/42008; H04M 3/42357; H04W 12/02; H04W 4/02

USPC ................ 455/456.3, 410; 380/247
See application file for complete search history.

(56) References Cited

U.S. PATENT DOCUMENTS

| 2003/0225893 | A1 | 12/2003 | Roese et al. | |
| 2004/0203900 | A1* | 10/2004 | Cedervall et al. | 455/456.1 |
| 2006/0003775 | A1* | 1/2006 | Bull et al. | 455/456.1 |
| 2008/0096590 | A1* | 4/2008 | Celik et al. | 455/466 |
| 2008/0299989 | A1* | 12/2008 | King et al. | 455/456.1 |
| 2009/0163211 | A1* | 6/2009 | Kitazoe et al. | 455/436 |
| 2010/0279673 | A1* | 11/2010 | Sharp et al. | 455/419 |

* cited by examiner

*Primary Examiner* — Ariel Balaoing
(74) *Attorney, Agent, or Firm* — Sterne, Kessler, Goldstein & Fox PLLC (57) ABSTRACT

A mobile device may communicate with a location server during location based services (LBS) operations using a secure identifier. The secure identifier abstracts identification information of the mobile device and/or identification information of a user of the mobile device in instances that the mobile device and/or user identification information are deemed protectable from the location server. The location server may be operable to store location data corresponding to the mobile device and/or the user in a location reference database based on the secure identifier. The secure identifier may comprise a unique value, which may be randomly generated. The secure identifier may also be generated based on the mobile device and/or user identification information, by applying, for example, encryption algorithms to the mobile device and/or user identification information. Service providers for the mobile device may retrieve the abstracted mobile device and/or user identification information from the secure identifier.

20 Claims, 4 Drawing Sheets

METHOD AND SYSTEM FOR ENSURING USER AND/OR DEVICE ANONYMITY FOR LOCATION BASED SERVICES (LBS)

CROSS-REFERENCE TO RELATED APPLICATIONS/INCORPORATION BY REFERENCE

This patent application makes reference to, claims priority to and claims benefit from U.S. Provisional Application Ser. No. 61/304,947 filed on Feb. 16, 2010. This application also makes reference to:
U.S. Provisional Application Ser. No. 61/312,979 filed on Mar. 11, 2010;
U.S. application Ser. No. 12/748,106 filed on even date herewith;
U.S. Provisional Application Ser. No. 61/312,994 filed on Mar. 11, 2010;
U.S. application Ser. No. 12/748,175 filed on even date herewith;
U.S. Provisional Application Ser. No. 61/303,794 filed on Feb. 12, 2010;
U.S. application Ser. No. 12/748,197 filed on even date herewith;
U.S. Provisional Application Ser. No. 61/309,260 which was filed on Mar. 1, 2010; and
U.S. application Ser. No. 12/748,104 filed on even date herewith.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communication. More specifically, certain embodiments of the invention relate to a method and system for ensuring user and/or device anonymity for location based services (LBS).

BACKGROUND OF THE INVENTION

Location based services (LBS) applications are emerging as a new type of value-added service provided by mobile communication network. LBS applications are mobile services in which the user location information is used to enable and/or support various applications and/or services such as, for example, enhanced 911 (E-911), location-based 411, location-based messaging and/or location-based friend finding services. A location of a communication device may be determined in different ways such as, for example, using network-based technology, using terminal-based technology, and/or hybrid technology, which may be a combination of the former technologies. Many positioning technologies such as, for example, Time of Arrival (TOA), Observed Time Difference of Arrival (OTDOA), Enhanced Observed Time Difference (E-OTD) as well as the Global navigation satellite-based systems (GNSS) such as Global Positioning System (GPS), Global Navigation Satellite System (GLONASS), Galileo, and/or Assisted-GNSS (A-GNSS), may be utilized to estimate the location (latitude and longitude) of the mobile device and convert it into a meaningful X, Y coordinate for Location-Based Services provided via wireless communication systems.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for ensuring user and/or device anonymity for location based services (LBS), substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for ensuring user and/or device anonymity for location based services (LBS). In various embodiments of the invention, a mobile device may communicate with a location server, during location based services (LBS) operations in the mobile device, using a secure identifier. Use of the secure identifier may enable abstracting identification information of the mobile device and/or identification information of user of the mobile device, in instances where the mobile device and/or user identification information may be deemed protectable, from the location server for example. The location server may be operable to store location data corresponding to the mobile device and/or the user, in a location reference database maintained in the location server for example, based on the secure identifier. The mobile device and/or user identification information may comprise an international mobile equipment identifier (IMEI) parameter. In one embodiment of the invention, the secure identifier may comprise a unique value, which may be randomly generated by the location server, the mobile device, and/or services providers for the mobile device. In one embodiment of the invention, the secure identifier may be generated based on the mobile device and/or user identification information. In this regard, the secure identifier may be generated by encrypting the mobile device and/or user identification information. The encryption may be performed utilizing a ciphering algorithm, which may hash at least a portion of the mobile device and/or user identification information. In this regard, the ciphering algorithm may comprise a Secure Hash Algorithm (SHA) based algorithm. The secure identifier may comprise portions of the mobile device and/or user identification information that may be used unencrypted. The secure identifier may comprise, for example, the type allocation code (TAC) field of the IMEI parameter. Services providers for the mobile device may be operable to retrieve the abstracted mobile device and/or user identification information from the secure identifier.

Figure 1:
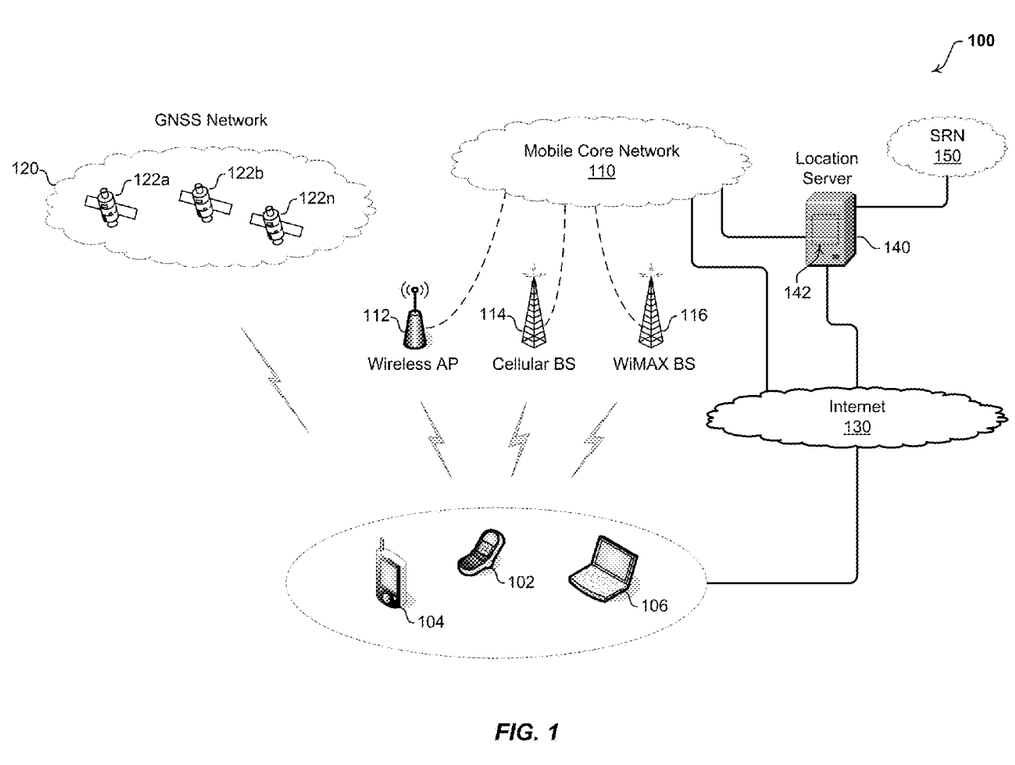
FIG. 1 is a block diagram illustrating an exemplary communication system that provides location based services to a plurality of mobile devices, in accordance with an embodiment of the invention.

FIG. 1 is a block diagram illustrating an exemplary communication system that provides location based services to a plurality of mobile devices, in accordance with an embodiment of the invention. Referring to FIG. 1, there is shown a communication system 100 comprising a plurality of mobile devices, of which the mobile devices 102-106 are illustrated. Exemplary mobile devices may comprise a cellular device, a Smartphone, a personal digital assistant (PDA), and/or the laptop 106. Also shown in the communication system 100 is a mobile core network 110, a wireless access point (AP) 112, a cellular basestation (BS) 114, a Worldwide Interoperability for Microwave Access (WiMAX) BS 116, a Global Navigation Satellite Systems (GNSS) network 120, a plurality of GNSS satellites 122a-122n, an Internet 130, a location server 140, and a satellite reference network (SRN) 150.

The GNSS network 120 may comprise suitable logic, circuitry, interfaces, and/or code that may provide navigation information to land-based devices via satellite links. In this regard, the GNSS network 120 may comprise, for example, the plurality of GNSS satellites 122a-122n, each of which is operable to provide satellite transmissions based on a global navigation satellite system (GNSS). In this regard, exemplary GNSS systems may comprise, for example, the Global Positioning System (GPS), GLONASS and/or Galileo based satellite system. Accordingly, the GNSS network 120 may be operable to provide positioning information via downlink satellite links transmitted from the one or more of the plurality of GNSS satellites 122a-122n to enable land-based devices, such as the mobile devices 102-106, to determine their locations. In this regard, the plurality of GNSS satellites 122a-122n may directly provide positioning information and/or a land-based device may utilize satellite transmissions from different satellites to determine its location using, for example, triangulation based techniques.

The Internet 130 may comprise a system of interconnected networks and/or devices that enable exchange of information and/or data among a plurality of nodes, based on one or more networking standards, including, for example, Internet Protocols (IP). The Internet 130 may enable, for example, connectivity among a plurality of private and public, academic, business, and/or government nodes and/or networks, wherein the physical connectivity may be provided via the Public Switched Telephone Network (PSTN), utilizing copper wires, fiber-optic cables, wireless interfaces, and/or other standards-based interfaces.

The wireless AP 112 may comprise suitable logic, circuitry, interfaces, and/or code that are operable to provide data services to communication devices, such as one or more of the mobile devices 102-106, in adherence with one or more wireless LAN (WLAN) standards such as, for example, IEEE 802.11, 802.11a, 802.11b, 802.11d, 802.11e, 802.11n, 802.11v, and/or 802.11u. The wireless AP 112 may communicate with the mobile core network 110 and/or the Internet 130, via one or more links and/or associated devices for example. In this manner, the wireless AP 112 may provide network access to the mobile devices 102-106.

The cellular BS 114 may comprise suitable logic, circuitry, interfaces, and/or code that are operable to provide voice and/or data services to communication devices, such as one or more of the mobile devices 102-106, in adherence with one or more cellular communication standards. Exemplary cellular communication standards may comprise Global System for Mobile communications (GSM), General Packet Radio Services (GPRS), Universal Mobile Telecommunications System (UMTS), Enhanced Data rates for GSM Evolution (EDGE), Enhanced GPRS (EGPRS), and/or 3GPP Long Term Evolution (LTE). The cellular BS 114 may communicate with the mobile core network 110 and/or the Internet 130, via one or more backhaul links and/or associated devices for example. In this manner, the cellular BS 114 may provide network access to the mobile devices 102-106.

The WiMax BS 116 may comprise suitable logic, circuitry, interfaces, and/or code that are operable to provide WiMax based data services to communication devices, such as one or more of the mobile devices 102-106. The WiMax BS 116 may communicate with the mobile core network 110 and/or the Internet 130, via one or more backhaul links and/or associated devices for example. In this manner, the WiMax BS 116 may provide network access to the mobile devices 102-106.

The mobile core network 110 may comprise suitable logic, circuitry, interfaces, and/or code that are operable to provide interfacing and/or connectivity servicing between access networks, which may be utilized by the mobile devices 102-106, and external data networks such as packet data networks (PDNs) and/or the Internet 130. The mobile core network 110 may correspond to one or more service providers that provide, control, and/or manage network accessibility available via the mobile devices 102-106. In this regard, the mobile devices 102-106 may access the mobile core network 110 via the wireless AP 112, the cellular BS 114, and/or the WiMAX BS 116. The mobile core network 110 may be configured to communicate various data services, which are provided by external data networks, to associated users such as, for example, the mobile devices 102-106. In an exemplary aspect of the invention, in instances where a LBS application is provided to a user such as the mobile device 102, the mobile core network 110 may be operable to communicate with the location server 140 for location information required for the LBS application.

Each of the mobile devices 102-106 may comprise suitable logic, circuitry, interfaces, and/or code for implementing various aspects of the invention disclosed herein. In this regard, each of the mobile devices 102-106 may be operable to communicate via a plurality of wired and/or wireless connections. Each of the mobile devices 102-106 may be operable, for example, to transmit and/or receive signals to and/or from one or more of the wireless AP 112, the cellular BS 114, WiMax BS 116, GNSS network 120, and/or the Internet 130. Also, each of the mobile devices 102-106 may be operable to communicate with, and/or receive services provided by the Internet 130 and/or the mobile core network 110. In this regard, the mobile devices 102-106 may be operable to utilize LBS applications using the location server 140.

The location server 140 may comprise suitable logic, circuitry, interfaces, and/or code that are operable to provide and/or support location based services (LBS). In this regard, the location server 140 may be operable to store and/or process location related information pertaining to communication devices in the system 100 for example, such as one or more of the mobile devices 102-106. The location information may be stored in a location reference database 142 in the location server 140. The location server 140 may be operable to collect and/or retrieve location information from communication devices. The location server 140 may also be operable to access additional and/or dedicated entities, such as the SRN 150 for example, to collect GNSS satellite data, and may be operable to utilize the collected GNSS satellite data to generate GNSS assistance data (A-GNSS data) comprising, for example, ephemeris data, LTO data, reference positions and/or time information. The location server 140 may communicate the stored location data when requested to do so. The SRN 150 may comprise suitable logic, circuitry, interfaces, and/or code that are operable to collect and/or distribute data for GNSS satellites on a continuous basis. The SRN 150 may comprise a plurality of GNSS reference tracking stations located around the world to provide A-GNSS coverage all the time in both a home network and/or any visited network. In this regard, the SRN 150 may utilize satellite signal received from various GNSS constellations, such as, for example, the plurality of GNSS satellites 122a-122n of the GNSS network 120.

In operation, the location server 140 may be utilized to provide location based services (LBS) in the system 100. The location server 140 may maintain, for example, the location reference database 142, which may comprise elements corresponding to, for example, each of the mobile devices 102-106. The location server 140 may access the SRN 150 to collect GNSS satellite data, and may utilize the collected GNSS satellite data to generate GNSS assistance data (A-GNSS data) pertaining to the mobile devices 102-106. The location server 140 may also collect and/or retrieve location information directly from the mobile devices 102-106, and/or from other associated entities that interact with the mobile devices 102-106 in the system 100, such as, for example, the wireless AP 112, the cellular BS 114, and/or the WiMax 116. The retrieved location information may be stored in the location reference database 142 in the location server 140. The location server 140 may communicate the stored location data when requested to do so. The location reference database 142, maintained in the location server 140, may be modified, refined, and/or updated using retrieved location information. The location information stored and/or maintained by the location server 140 may be utilized to augment and/or substitute for location information received and/or generated based on communication with the GNSS network 120, for example, when communication with the GNSS network 120 is disturbed.

The location data may also be locally generated, and/or maintained thereafter by devices and/or entities other than the location server 140. In this regard, location related data, which typically may be generated and/or maintained by the location server 140, may be locally generated, maintained, and/or used by the mobile devices 102-106, and/or by service providers thereof. Accordingly, devices and/or entities that typically may be serviced by the location server 140, such as the mobile devices 102-106, may also perform location related servicing locally. Furthermore, the locally generated and/or maintained location related data may be uploaded from the mobile devices 102-106, and/or services providers thereof, to the location server 140. Uploading the location related data may be performed periodically, on request, and/or based on configuration of the client devices or entities, and/or the location server 140 itself.

The location information stored and/or maintained in the location server 140 may be utilized to authenticate, for example, one or more of the mobile devices 102-106, users thereof, and/or locations thereof during operations performed by the mobile devices 102-106. In this regard, service providers, who may provide access servicing to the mobile devices 102-106, may contact the location server 140 to request that the location server 140 perform, and/or obtain information necessary for performing the authentication procedures. The service providers may comprise, for example, cellular, WiMax, and/or WLAN services providers. For example, a service provider of the mobile device 104 may request authenticating the mobile device 104, its user, and location at a given instance. The location server 140 may then perform the necessary authentication procedures, which may be based on existing information in the location reference database 142, which is maintained by the location server 140. The location server 140 may also perform authentication procedures based on current information, which may be obtained by, for example, communicating with the mobile device 104, to verify its present location and/or connectivity status or parameters for example. In this regard, the location server 140 may communicate with the mobile device 104 using IP packets that maybe communicated via the Internet 130, which may be transmitted to and/or received from the mobile device 104 via its Internet connectivity, and/or via its network access via the wireless AP 112, the cellular 114, and/or the WiMax AP 116.

In an exemplary aspect of the invention, the system 100 may utilize various security protocols and/or procedures to ensure secured exchange of location information among various devices and/or entities that may provide, request, participate in, and/or support LBS applications in the system 100. This may comprise, for example, the location server 140, authenticated entities, such as one or more of the mobile devices 102-106 and/or users thereof; and/or entities that may seek and/or require authentication of other devices and/or may provide necessary information during any such operations, such as services providers for any of the mobile devices 102-106. In this regard, various security techniques may be used to ensure, for example, anonymity of the mobiles devices 102-106, and/or their users, during communications with the location server 140. Various device and/or user identification information may be utilized during network access and/or communications, which may be structured, allocated, and/or assigned based on the specific wired and/or wireless protocols that are used to facilitate any such network access and/or communication. For example, in GSM and/or WCDMA based networks International Mobile Equipment Identity (IMEI) parameters may be utilized to uniquely identify mobiles devices, and these IMEI parameters may also be used and/or traced back to the mobile devices' users. Service providers may utilize the device and/or user identification information to track mobile devices and/or users. The service providers may track devices and/or users for various reasons, including, for example, billing or usage monitoring, and/or to help locate mobile devices, and/or their users, in cases of emergency and/or law enforcement purposes, for example. However, while knowledge of such device and/or user identification information by service providers may be acceptable and/or required, sharing this knowledge with external entities, such as the location server 140, may be undesirable and/or objectionable, for confidentiality reasons for example.

Accordingly, in various embodiments of the invention, at least some of the device and/or user identification parameters that are used during normal network access operations in the mobile devices may be abstracted and/or hidden during interactions with external entities providing and/or supporting LBS applications, such as the location server 140. The mobile devices 102-106 and/or the mobile core network 110 may determine which of device and/or user identification parameters should be protected and/or hidden from, for example, the location server 140. Various techniques may then be utilized to facilitate abstracting these device and/or user identification parameters. For example, anonymity of mobile devices and/or their users may be ensured by using LBS applications-based identifiers that are correlated to specific mobile devices and/or users thereof, but are not reversible in the location servers. Only the mobile devices and/or certain entities, such as the service providers for example, may be able to derive the actual device and/or user identification information from the corresponding secure LBS identifiers. For example, during LBS applications in the system 100, each of the mobile devices 102-106 may be allocated a unique LBS identifier that is utilize during interactions by the mobile devices 102-106 and/or the mobile core network 110 with the location server 140. The location server 140 may then utilize these LBS identifiers in generating, maintaining, and/or updating the location reference database 142. The mobile devices 102-106 and the mobile core network 110 may still utilize the actual device and/or user identification information, such as the IMEI parameters assigned to these devices, during normal network access and/or interactions by the mobile devices 102-106, with the cellular BS 114 for example. Furthermore, the mobile devices 102-106 and/or the mobile core network 110 may be operable to map the LBS identifiers to and/or from the actual device and/or user identification information.

Various techniques may be utilized to generate the LBS-specific identifiers, wherein the LBS identifiers may be generated by the mobile devices, services provider, location servers, and/or any combinations thereof. For example, LBS device identifiers may be generated based on randomly allocated values, which are independent from the actual mobile and/or user identification parameters utilized during normal network access and/or communication. In this regard, the LBS identifiers may be generated randomly and/or dynamically by the location server 140, to ensure that the values are unique. The generated LBS identifiers may then be communicated directly to the mobile devices 102-106, via the Internet 130 for example, using connections that may not require disclosing device and/or user identification parameters deemed protectable. For example, the location server may communication the LBS identifier via the Internet 130, using peer-to-peer connections which may necessitate only use of IP addresses. The location server 140 may also generate a set of LBS identifiers that may then be communicated to the mobile core network 110, which may allocate the LBS identifiers to serviced mobile devices. The LBS identifiers may also be generated by the mobile core network 110, which may then assign LBS identifiers to the mobile devices 102-106 and communicate the assigned LBS identifiers to the location server 140. In some embodiments, the LBS identifiers may be generated randomly by the mobile device 102-106. In this regard, the generated values may be validated to ensure that they are unique be performing a validation procedure between the mobile device and the location server 140 (and/or the mobile core network 110).

The LBS identifiers may also be generated from mobile and/or user identification information, by applying, for example, cryptographic algorithms and protocols. For example, the mobile and/or user identification information may be encrypted by the mobile devices 102-106, to generate corresponding LBS identifiers. These LBS identifiers may then be utilized during communication with the location server 140. The mobile core network 110 may be operable to extract the mobile and/or user identification information, for each of the mobile devices 102-106, from the corresponding LBS identifiers by applying the corresponding decryption operations. In this regard, the encryption operations may utilize hashing algorithms, for example, Secure Hash Algorithm (SHA) to hash at least a portion of mobile and/or user identification parameters. For example during LBS applications in the system 100, the mobile device 104 may hash its IMEI parameter, using SHA-256 algorithm for example, to generate a corresponding LBS secure identifier, comprising the algorithm's digest, which may be utilized in LBS-related interactions with the location server 140. The mobile core network 110 may extract the actual IMEI parameter corresponding to the mobile device 104 by applying the corresponding SHA-256 algorithm. In this regard, the mobile device 104 and the mobile core network 110 may determine and/or exchange the necessary encryption/decryption parameters prior to, for example, initiating LBS applications. The LBS identifiers may also be generated from mobile and/or user identification information, by using only portions of identification parameters that are determined to be sufficiently unique to distinguish the mobile devices in LBS applications, while at the same time maintaining acceptable level of confidentiality. For example, LBS identifiers may be generated using the Type Allocation Code (TAC) portion of the IMEI parameters, which may also be combined with the location and/or time data to generate a corresponding unique LBS identifier.

In an exemplary embodiment of the invention, in instances where a mobile device may have a plurality of services providers, multiple LBS identifiers may be generated for each mobile and/or user identification parameters. In this regard, each LBS identifier may be utilized with a corresponding services provider, to hide and/or abstract mobile and/or user identification information from both the location servers and other services providers. For example, the mobile device 104 may have multiple services providers. Accordingly, multiple LBS identifiers may be generated based on the IMEI parameter of the mobile device 104, by applying different hashing algorithms, such that each LBS identifier would correspond to, and/or may be decipherable by only a specific service provider.

Figure 2:
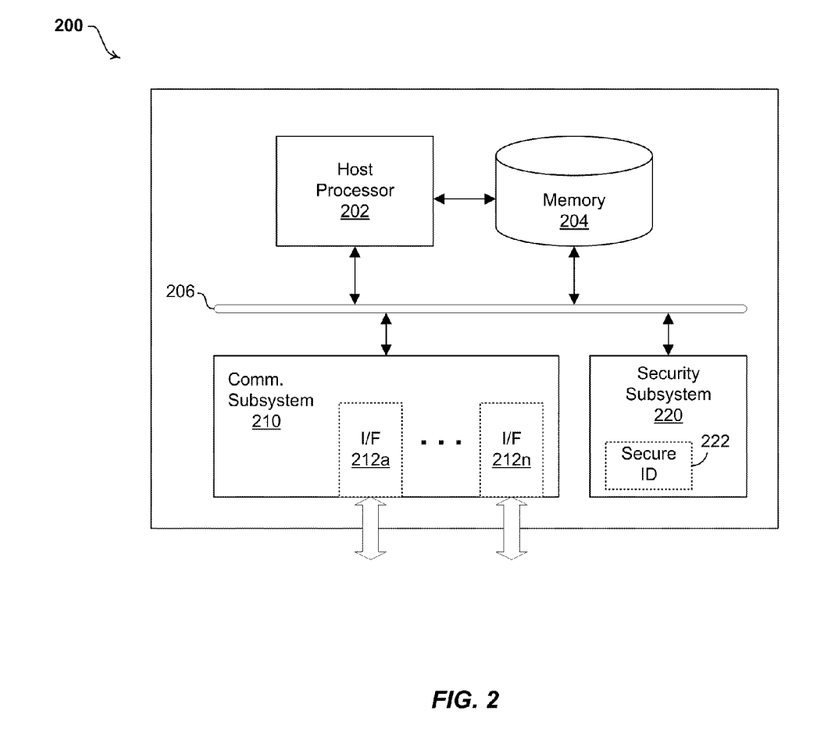
FIG. 2 is a block diagram illustrating an exemplary processing system that is operable to support use of location based services (LBS) in a mobile device, in accordance with an embodiment of the invention.

FIG. 2 is a block diagram illustrating an exemplary mobile device that supports use of location based services (LBS), in accordance with an embodiment of the invention. Referring to FIG. 2 there is shown a device 200, a host processor 202, a system memory 204, a system bus 206, a communication subsystem 210, a plurality of interface processing blocks 212a-212n, a security subsystem 220, and secure identification (ID) processing block 222.

The device 200 may comprise the host processor 202, the system memory 204, the system bus 206, the communication subsystem 210, and the security subsystem 220. The device 200 may correspond to, for example, each of the mobile devices 102-106 of FIG. 1. In this regard, the device 200 may enable reception and/or transmission of signals during communication via one or more wired and/or wireless connections. The device 200 may also be operable to support LBS applications, and may incorporate use of various security mechanisms to ensure user and/or device anonymity during interactions with location servers, substantially as described with regard to FIG. 1.

The host processor 202 may comprise suitable logic, circuitry, interfaces, and/or code that may be operable to process data and/or control operations of the device 200. In this regard, the host processor 202 may be operable to configure and/or control operations of various components and/or systems of the device 200, by providing, for example, control signals. The host processor 202 may also control data transfers within the device 200. The host processor 202 may enable execution of applications, programs and/or code, which may be stored in the system memory 204 for example, to enable performing various web browsing support operations.

The system memory 204 may comprise suitable logic, circuitry, interfaces, and/or code that enable permanent and/or non-permanent storage and/or fetching of data, code and/or other information used in the device 200. In this regard, the system memory 204 may comprise different memory technologies, including, for example, read-only memory (ROM), random access memory (RAM), and/or Flash memory. The system memory 204 may store, for example, information comprising configuration data used during LBS operations in the device 200. The configuration data may comprise parameters and/or code, which may comprise software and/or firmware, but the configuration data need not be limited in this regard.

The system bus 206 may comprise suitable logic, circuitry, interfaces, and/or code that may enable exchange of data and/or information between various components and/or systems in the device 200. In this regard, the system bus may comprise parallel or serial, and/or internal or external based bus technologies, and/or any combinations thereof. Exemplary system bus interfaces may comprise Inter-Integrated Circuit (I$^2$C), Universal Serial Bus (USB), Advanced Technology Attachment (ATA), Small Computer System Interface (SCSI), Peripheral Component Interconnect (PCI), and/or Peripheral Component Interconnect Express (PCI-e) based interfaces.

The communication subsystem 210 may comprise suitable logic, circuitry, code, and/or interfaces that may enable communication of data, content, and/or messaging from and/or to the device 200, based on one or more wired and/or wireless protocols. The communication subsystem 210 may comprise, for example, the plurality of I/F processing blocks 212a-212n that may be operable to perform communication based on wired or wireless standards supported in the device 200. In this regard, each of the plurality of I/F processing blocks 212a-212n may comprise suitable logic, circuitry, interfaces, and/or code that are operable to detect, receive, and/or transmit signals based on specific frequency bands and/or modulation schemes. The I/F processing blocks 212a-212n may also be operable to perform necessary processing operations, which may comprise, for example, buffering, filtering, modulation/demodulation, up-conversion/down-conversion, and/or digital-to-analog/analog-to-digital conversion. The plurality of the IF processing blocks 212a-212n may be configured to support, for example, transmission and/or reception of RF signals during communication based on Ethernet, Bluetooth, WLAN, cellular, WiMax, GNSS, FM interfaces and/or protocols.

The security subsystem 220 may comprise suitable logic, circuitry, interfaces, and/or code that may be operable to perform security related operations in the device 200. In this regard, the security subsystem 220 may perform user authentication, certificate usage, and/or cryptographic operations in the device 200. The security subsystem 220 may comprise the secured ID processing block 222, which may comprise suitable logic, circuitry, code, and/or interfaces that may be operable to ensure, for example, secured communications between the device 200 and location servers during LBS operations. The secure ID processing block 222 may ensure, for example, anonymity of the device 200, and/or users thereof, during LBS applications in the device 200.

In operation, the device 200 may be utilized to perform network access and/or communication based on one or more wired or wireless interfaces. In this regard, the device 200 may provide network accessibility and/or communication, via the communication subsystem 210, with the wireless AP 112, the cellular BS 114, the WiMax BS 116, and/or the Internet 130. During operations in the device 200, the host processor 202 may manage and/or control operations of, for example, communication subsystem 210 and/or security subsystem 220. In an exemplary aspect of the invention, the device 200 may be operable to support LBS application. In this regard, the device 200 may communicate, using the communication subsystem 210, with a location server, such as the location server 140 of FIG. 1. The device 200 may interact with the location server 140 via the internet 130, using, for example, the I/F processing block 212a, which may be configurable for LAN based Ethernet communications.

In various embodiments of the invention, the device 200 may be operable and/or configurable to ensure device and/or user anonymity during LBS interactions with the location server 130. In this regard, the secure ID processing block 222 may generate and/or use one or more LBS-applications related identifiers for each device and/or user identification parameter in the device 200, wherein each LBS identifier may correspond to a specific service provider for the device 200, and/or a user thereof. In this regard, the secure ID processing block 222 may be configured, by the host processor 202 for example, to implement one or more supported techniques for using the LBS identifiers that may be supported by the device 200. For example, the secure ID processing block 222 may utilize LBS identifiers that may be generated, by the location server 140 for example, based on randomly allocated values, which may be received from the location server 140, substantially as described with regard to FIG. 1. The secure ID processing block 222 may also be configured to implement cryptography techniques to cipher at least a portion of the protectable device and/or user identification parameters. For example, the secure ID processing block 222 may be configured, via the host processor 202, to utilize SHA-256 based algorithm to hash at least portions of certain device and/or user identification parameters, for example the IMEI. During communication with the location server 140, the secure ID processing block 222 may provide the appropriate LBS identifier to the communication subsystem 210, via the system bus 206 for example. The communication subsystem 210 may incorporate the LBS identifier during transmission and/or reception of messaging to and/or from the location server 140.

Figure 3:
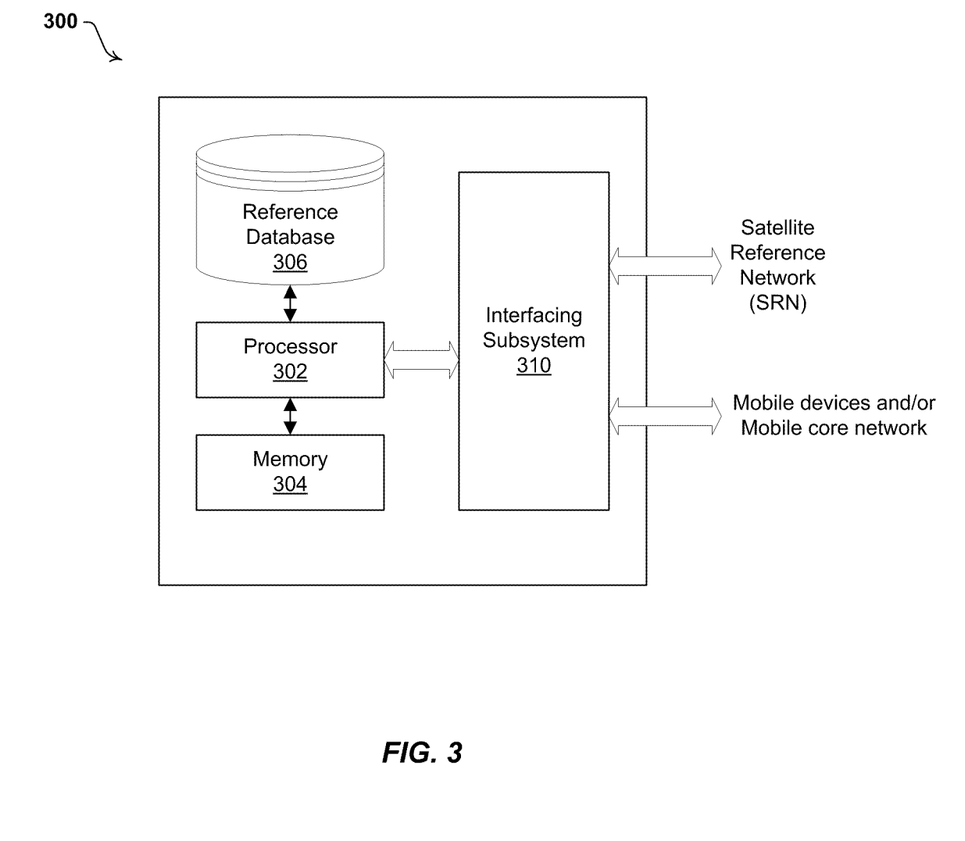
FIG. 3 is a block diagram illustrating an exemplary location based services (LBC) server, in accordance with an embodiment of the invention.

FIG. 3 is a block diagram illustrating an exemplary location based services (LBC) server, in accordance with an embodiment of the invention. Referring to FIG. 3 there is shown a server 300, a processor 302, a memory 304, a reference database 306, and an interfacing subsystem 310.

The server 300 may comprise the processor 302, the memory 304, the reference database 306, and the interfacing subsystem 310. The server 300 may correspond to, for example, the location server 140 of FIG. 1. In this regard, the server 300 may be operable to provide and/or support location based services (LBS), and/or to support use of various security protocols and/or procedures to ensure device and/or user anonymity during LBS interactions, as described with regard to FIG. 1.

The processor 302 may comprise suitable logic, circuitry, interfaces, and/or code that may be operable to manage and/or control operations of the server 300. In this regard, the processor 302 may be operable to configure and/or control operations of various components and/or systems of the server 300, by providing, for example, control signals. The processor 302 may also control data transfers within the system 300, including data storage and/or retrieval from memory 304 and/or generating, storing, and/or updating elements in the reference database 306. The processor 302 may enable execution of applications, programs and/or code, which may be stored in the memory 304 for example, to enable performing various services and/or application requested from the server 300, including location based services (LBS) applications for example. The memory 302 may comprise suitable logic, circuitry, interfaces, and/or code that enable permanent and/or non-permanent storage and/or fetch of data, code and/or other information used in the server 300. In this regard, the memory 304 may comprise different memory technologies, including, for example, read-only memory (ROM), random access memory (RAM), and/or Flash memory. The memory 304 may be operable to store, for example, information comprising, for example, data and/or code used during LBS operations in the server 300. The data and/or code may comprise configuration data or parameters, and the code may comprise operational code such as software and/or firmware, but the information need not be limited in this regard.

The reference database 306 may comprise suitable logic, circuitry, interfaces, and/or code that may be operable to store location information of associated communication devices such as, for example, the mobile devices 102-106. The reference database 306 may be internally or externally coupled to the server 300. The stored location information may be provided to the associated devices and/or users to support LBS applications. The reference database 306 may be operable to manage and update the stored location information when requested, dynamically whenever any change is detected, and/or periodically.

The interfacing subsystem 310 may comprise suitable logic, circuitry, interfaces, and/or code that may enable communication of data, content, and/or messaging from and/or to the server 300. The interfacing system 310 may support, for example, a plurality of physical and/or logical connections, based on one or more wired and/or wireless interfaces in the server 300. In this regard, the interfacing system 330 may comprise, for example, one or more network interface cards (NIC) and/or wireless network interface cards (WNIC).

In operation, the server 300 may be utilized to provide location based services (LBS). To facilitate LBS operations and/or servicing via the server 300, the processor 302 may be operable to communicate, via the interfacing subsystem 310, with a satellite reference network (SRN), such as the SRN 150, to collect, for example, GNSS satellite data by tracking GNSS constellations. The processor 302 may utilize the collected GNSS satellite data to build and/or update the reference database 306, which may be coupled internally or externally to the server 300. The processor 302 may retrieve or collect location information from associated users, such as the device 200. The server 300 may provide location information by retrieving it from the reference database 306. In this regard, the server 300 may store the location information in the reference database 306 as elements that may be indexed using identifiers that are specific to serviced devices and/or users thereof.

In an exemplary aspect of the invention, the server 300 may support use of LBS-specific identifiers that may ensure anonymity of device and/or user identification parameters that are otherwise used during normal network access and/or communication operations in the services devices. For example, the processor 302 may randomly generate LBS-specific identifiers that are then utilized in accessing the reference database 306. The LBS-specific identifiers may then be communicated to the mobile network core 110 and/or services mobile devices, via the Internet 130 for example, to enable the serviced entities to use the LBS identifier for communicating with the server 300. The LBS identifiers may be mapped to the protected device and/or user identification parameters by the mobile core network 110 and/or the mobile device 102-106. The server 300 may also utilize identifiers that are communicated by the mobile device 102-106 and/or the mobile core network 110 for managing and/or maintaining the reference database 306. The LBS identifiers may be generated, by the mobile devices for example, based on encrypting of protectable device and/or user identification parameters, substantially as described with regard to FIG. 1.

Figure 4:
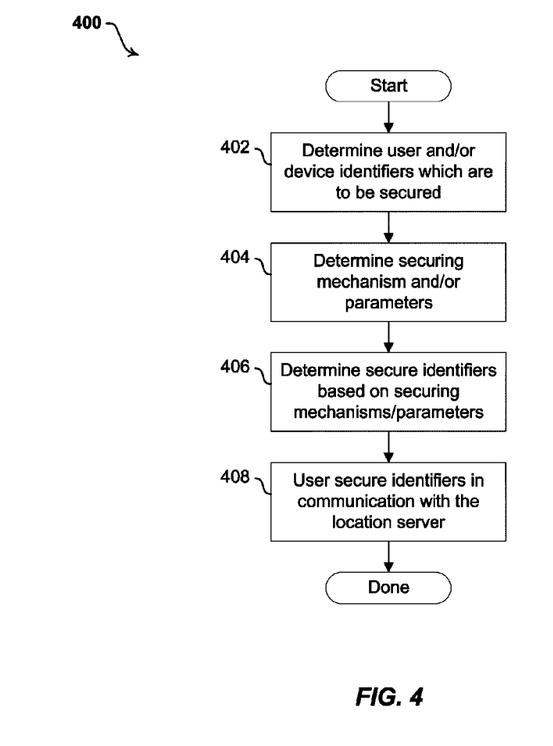
FIG. 4 is a flow chart that illustrates exemplary steps for ensuring user and/or device anonymity during location based services (LBS) in a mobile device, in accordance with an embodiment of the invention.

FIG. 4 is a flow chart that illustrates exemplary steps for ensuring user and/or device anonymity during location based services (LBS) in a mobile device, in accordance with an embodiment of the invention. Referring to FIG. 4, there is shown a flow chart 400 comprising a plurality of exemplary steps that may be performed to enable ensuring user and/or device anonymity for location based services (LBS).

In step 402, device and/or user identifiers which are to be protected may be determined. For example, the device 200 may determine one or more device and/or user identification parameters which may need to be protected and/or secured during LBS related operations in the device 200. Exemplary protectable identification parameters may comprise the IMEI parameter. In step 404, securing mechanism and/or parameters may be determined. For example, the device 200 may determined whether encryption based techniques may be utilized to protect its IMEI parameter. In this regard, the device 200 may implement SHA based ciphering algorithms to hash at least a portion of the IMEI parameter, substantially as described with regard to FIG. 2. In step 406, secure LBS-specific identifiers may be determined based on securing mechanisms/parameters determined in the previous step. For example, the device 200 may generate the LBS identifier that is utilized in communicating with the server 300 by hashing its IMEI using SHA-256 algorithm. In step 408, the secure LBS-specific identifier may be utilized during LBS related communications. For example, the device 200 may utilize the LBS identifier generated from hashing its IMEI using SHA-256 algorithm in communicating with the server 300.

Various embodiments of the invention may comprise a method and system for ensuring user and/or device anonymity for location based services (LBS). The device 200 may communicate with a server 300, via the communication subsystem 210, during location based services (LBS) operations in the device 200 using a secure identifier, which may be used specifically for LBS applications. Use of the secure identifier may enable abstraction of mobile device and/or user identification information of the device 200, which may be deemed to be, via the host processor 202 for example, protectable from the server 300. The server 300 may be operable to store location data corresponding to the device 200, and/or users thereof, in the reference database 306 for example, based on the secure identifier. The mobile device and/or user identification information may comprise, for example, an international mobile equipment identifier (IMEI) parameter. The secure identifier may comprise a unique value, which may be randomly generated by the server 300, the device 200, and/or services providers for the device 200, and/or any combination thereof. The secure identifier may also be generated, via the secure ID processing block 222 in the device 200 for example, based on the mobile device and/or user identification information. In this regard, the secure ID processing block 222 may generate the secure identifier by encrypting the mobile device and/or user identification information. The encryption may be performed utilizing a ciphering algorithm that may hash at least a portion of the mobile device and/or user identification information. The ciphering algorithm may comprise Secure Hash Algorithm (SHA) based algorithms, such as the SHA-256 algorithm. The secure identifier may also comprise portions of the device and/or user identification information, which may be used unencrypted. In this regard, the secure identifier may comprise, for example, the type allocation code (TAO) field of the IMEI parameter. Services providers for the device 200 may retrieve the abstracted mobile device and/or user identification information from the secure identifier.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for ensuring user and/or device anonymity for location based services (LBS).

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A mobile device comprising:
a processor configured to control operation of said mobile device;
a security subsystem configured to encrypt identification information of said mobile device using a hashing algorithm, and to generate a secure identifier comprising said encrypted identification information; and
a communications subsystem configured to use said secure identifier during communication with a location server during location based services (LBS), wherein said communication comprises transmission of location data of said mobile device and receipt of said LBS;
wherein said secure identifier protects anonymity of said mobile device at said location server, which is configured to provide LBS to said mobile device without deciphering said identification information.

2. The mobile device according to claim 1, wherein said identification information of said mobile device comprises an international mobile equipment identifier (IMEI).

3. The mobile device according to claim 1, wherein said identification information of said mobile device does not uniquely identify said mobile device.

4. A server comprising:
a database configured to store and index location information of a mobile device based on a secure identifier, the secure identifier comprising encrypted identification information of said mobile device that was encrypted using a hashing algorithm;
a processor configured to access and update said location information based on said secure identifier; and
a communications system configured to communicate with said mobile device and service providers of location based services (LBS) for said mobile device using said secure identifier, and receive said location information from said mobile device using said secure identifier and request for said LBS from said mobile device using said secure identifier,
wherein said secure identifier protects anonymity of said mobile device at said server, which is configured to provide LBS to said mobile device without deciphering said identification information.

5. The server of claim 4, wherein said processor is further configured to update said database whenever a change is detected from said mobile device.

6. A method comprising:
determining identification information of a mobile device to use during communication with a location server that stores location data of said mobile device during location based services (LBS) operations;
encrypting, by a security subsystem of said mobile device, said identification information using a hashing algorithm;
generating, by said security subsystem of said mobile device, a secure identifier comprising said encrypted identification information; and
communicating, by a communication subsystem of said mobile device, with said location server using said secure identifier to identify said mobile device to said location server;
wherein said secure identifier protects anonymity of said mobile device at said location server, which is configured to provide LBS to said mobile device without deciphering said identification information.

7. The method of claim 6, wherein said determining is performed by said mobile device.

8. The method of claim 6, wherein said communicating comprises:
transmitting said location data of said mobile device to said location server using said secure identifier to identify said mobile device to said location server; and
receiving said LBS from said location sever using said secure identifier.

9. The mobile device according to claim 1, wherein said communications subsystem is further configured to use said secure identifier during communication with a services provider, which is configured to decipher said identification information.

10. The mobile device according to claim 9, wherein:
said security subsystem is further configured to encrypt said identification information of said mobile device utilizing another hashing algorithm, and to generate another secure identifier comprising said identification information encrypted utilizing said another hashing algorithm, and said communications subsystem is further configured to use said another secure identifier to communicate with a second services provider.

11. The mobile device according to claim 9, wherein:

said security subsystem is further configured to encrypt other identification information of said mobile device utilizing another hashing algorithm, and to generate another secure identifier comprising said encrypted other identification information, and said communications subsystem is further configured to use said another secure identifier to communicate with a second services provider.

12. The mobile device according to claim 3, wherein said identification information comprises a Type Allocation Code (TAC) of an international mobile equipment identifier (IMEI).

13. The server of claim 4, wherein said identification information of said mobile device comprises an international mobile equipment identifier (IMEI).

14. The server of claim 4, wherein said identification information of said mobile device does not uniquely identify said mobile device.

15. The method of claim 6, wherein said identification information of said mobile device comprises an international mobile equipment identifier (IMEI).

16. The method of claim 6, wherein said identification information of said mobile device does not uniquely identify said mobile device.

17. The method of claim 16, wherein said identification information comprises a Type Allocation Code (TAC) of an international mobile equipment identifier (IMEI).

18. The method of claim 6, further comprising:

communicating, by said communication subsystem of said mobile device, with a services provider using said secure identifier to identify said mobile device to said services provider, wherein said services provider is configured to decipher said identification information.

19. The method of claim 18, further comprising:

encrypting, by said security subsystem of said mobile device, said identification information of said mobile device using another hashing algorithm; and generating, by said security subsystem of said mobile device, another secure identifier comprising said identification information encrypted using said another hashing algorithm; and communicating, by said communication subsystem of said mobile device, with a second services provider using said another secure identifier to identify said mobile device to said second services provider.

20. The method of claim 18, further comprising:

encrypting, by said security subsystem of said mobile device, other identification information of said mobile device using another hashing algorithm; and generating, by said security subsystem of said mobile device, another secure identifier comprising said encrypted other identification information; and communicating, by said communication subsystem of said mobile device, with a second services provider using said another secure identifier to identify said mobile device to said second services provider.

* * * * *

UNITED STATES PATENT AND TRADEMARK OFFICE
CERTIFICATE OF CORRECTION

PATENT NO.         : 9,065,908 B2                    Page 1 of 1
APPLICATION NO.    : 12/732849
DATED              : June 23, 2015
INVENTOR(S)        : Buer et al.

It is certified that error appears in the above-identified patent and that said Letters Patent is hereby corrected as shown below:

In the Claims

In column 14, line 57, replace "sever" with --server--.

Signed and Sealed this
Third Day of May, 2016

Michelle K. Lee
*Director of the United States Patent and Trademark Office*